(12) United States Patent
Hamamura et al.

(10) Patent No.: US 6,606,535 B1
(45) Date of Patent: Aug. 12, 2003

(54) NUMERICAL CONTROL APPARATUS AND FEED CONTROL PROCESSING METHOD THEREFOR

(75) Inventors: Minoru Hamamura, Numazu (JP); Sadaji Hayama, Tochigi-ken (JP); Jun Fujita, Mishima (JP); Kazuhiro Shiba, Numazu (JP)

(73) Assignee: Toshiba Kikai Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/571,516

(22) Filed: May 16, 2000

(30) Foreign Application Priority Data

May 17, 1999 (JP) ............................................. 11-136049

(51) Int. Cl.⁷ ...................... G05B 19/4103; G06F 19/00
(52) U.S. Cl. ...................... 700/159; 700/173; 700/181; 700/182; 700/186; 700/187; 700/188; 700/189; 700/193; 700/194; 700/56; 700/61; 700/63; 700/28; 700/32; 700/77
(58) Field of Search ............................... 700/56, 61, 63, 700/28, 32, 77, 186, 187, 188, 192, 193, 159; 1/1

(56) References Cited

U.S. PATENT DOCUMENTS 5,528,506 A * 6/1996 Yoshida et al. ............. 700/188
5,723,961 A * 3/1998 Fujino et al. ............... 700/189
5,923,560 A * 7/1999 Ozaki et al. ................ 700/192
5,930,142 A * 7/1999 Schleicher et al. ................ 1/1

* cited by examiner

Primary Examiner—Leo Picard
Assistant Examiner—Charles Kasenge
(74) Attorney, Agent, or Firm—Finnegan, Henderson, Farabow, Garrett, & Dunner, L.L.P.

(57) ABSTRACT

A machining program is read in and interpreted and a determination is made as to whether the amount of movement called for by a block of commands is larger or smaller than a minimum amount of movement that is established by a feed speed and a one sampling period of a numerical control apparatus. If the amount of movement called for is greater than the minimum amount of movement, feed control is performed in accordance with the current block. If the amount of movement called for by the current block of commands is smaller than the minimum movement amount, an immediate subsequent block of commands is concatenated with the current block, and this concatenation of command blocks is continued until a synthesized block calling for an amount of movement greater than the minimum amount of movement is obtained, this synthesized block then being used to perform feed control.

3 Claims, 3 Drawing Sheets

NUMERICAL CONTROL APPARATUS AND FEED CONTROL PROCESSING METHOD THEREFOR

BACKGROUND OF THE INVENTION

1. Field of the Invention

The present invention relates to a numerical control apparatus and a feed control processing method therefor. More particularly, the invention relates to a numerical control apparatus and a feed control processing method for a numerical control apparatus, which performs feed control in a machine tool or machining robot.

2. Description of the Related Art

In a machining of a curved surface, such as in a die machining, it can occur that the amount of movement to be called for by one block of commands in a machining program prepared for a CAD (computer aided design) or CAM (computer aided manufacturing) system or the like is smaller than a minimum amount of movement that depends on a feed speed and a one-sampling period of an associated numerical control apparatus.

If feed control is attempted on the basis of an amount of movement smaller than the minimum amount of movement, as that amount is called for by one block of commands, it then so follows that a movement to be made by that block of commands is completed within the one-sampling period of the numerical control apparatus, and a feed-suspended state is maintained until a subsequent sampling period starts. As a result, there is made an intermittent feed, with which a moving state and a suspended state are repeated, by which vibrations are caused in an associated feed system, resulting in a rough machined surface.

It is possible to reduce shocks due to such vibrations, by reducing the gain (or response speed) of the feed control. However, such a reduction of gain accompanies a worsened tracking performance, and causes the machining accuracy to be wholly lowered. It also increases the steady-state error of an associated servo system, and gives rise to errors such as by a shortened radius in a circular interpolation and a sagging at a corner, again resulting in a lowered machining accuracy.

In the past, therefore, in cases in which the amount of movement by one block of commands was smaller than a minimum amount of movement, the speed of feed was reduced over an entirety of an associated machining program to make the amount of movement by one block of commands larger than the minimum amount of movement, so that a continuous feed was secured.

While the above-noted approach of reducing the overall feed speed of the machining program if the amount of movement called for by a block of commands is smaller than the minimum amount of movement is effective in avoiding intermittent feed, the reduction in feed speed is accompanied by an inevitable loss of machining capacity.

SUMMARY OF THE INVENTION

Accordingly, in view of the above-described problem with the related art, it is an object of the present invention to provide a numerical control apparatus and a feed control processing method for a numerical control apparatus, which achieve continuous feed and further achieve both machining accuracy and machining capacity, without reducing the feed speed.

To achieve the above-noted object, a method for feed control in a numerical control apparatus according to the present invention reads a machining program, and determines if the amount of movement required by one block of commands is less than or greater than the minimum amount of movement, which is established by the feed speed and one sampling period of the numerical control apparatus. If the amount of movement for the block of commands is determined as being larger than the minimum movement amount, feed control is performed in accordance with the block of commands. If, however, the amount of movement is smaller than the minimum amount of movement, a block is synthesized from the current block and the immediately next block, this synthesis being continued until the amount of movement called for by the synthesized block is greater than the minimum movement amount, at which point feed control is performed in accordance with thereby synthesized block.

Another form of the present invention that achieves the above-noted object is a numerical control apparatus that determines if the amount of movement required by one block of commands is less than or greater than the minimum amount of movement, which is established by the feed speed and one sampling period of the numerical control apparatus, and which performs feed control according that block of commands if the amount of movement required is greater than the minimum movement amount. If, however, the amount of movement for the block is less than the minimum movement amount, the apparatus synthesizes a block from the current block and the following block of commands, this synthesis with following blocks being continued until the amount of movement called for by the synthesized block is greater than the minimum movement amount, at which point the apparatus performs feed control according to the synthesized block of commands.

More specifically, a numerical control apparatus that achieves the above-noted object has a machining program interpreter for reading in and interpreting a machining program, a one-block movement calculator for calculating the amount of movement called for by one block of commands interpreted by the machining program interpreter, an interpolation calculator for performing interpolation for each block, a movement comparator for comparing the amount of movement required by one block as calculated by the one-block movement calculator and the minimum amount of movement as established by the feed speed and one sampling period of the numerical control apparatus, and passing the commands of a block to the interpolation calculator only if the amount of movement for that block is larger than the minimum movement amount, and a block synthesizer, which if the amount of movement called for by the current block is determined by the above-noted comparison to be smaller than the minimum movement amount, reads ahead to the immediately following block and concatenates that block with the current block.

BRIEF DESCRIPTION OF THE DRAWINGS

The above and further objects and novel features of the present invention will more fully appear from the following detailed description when the same is read in conjunction with the accompanying drawings, in which.

DESCRIPTION OF THE PREFERRED EMBODIMENTS

Embodiments of the present invention are described in detail below, with reference made to relevant accompanying drawings.

Figure 1:
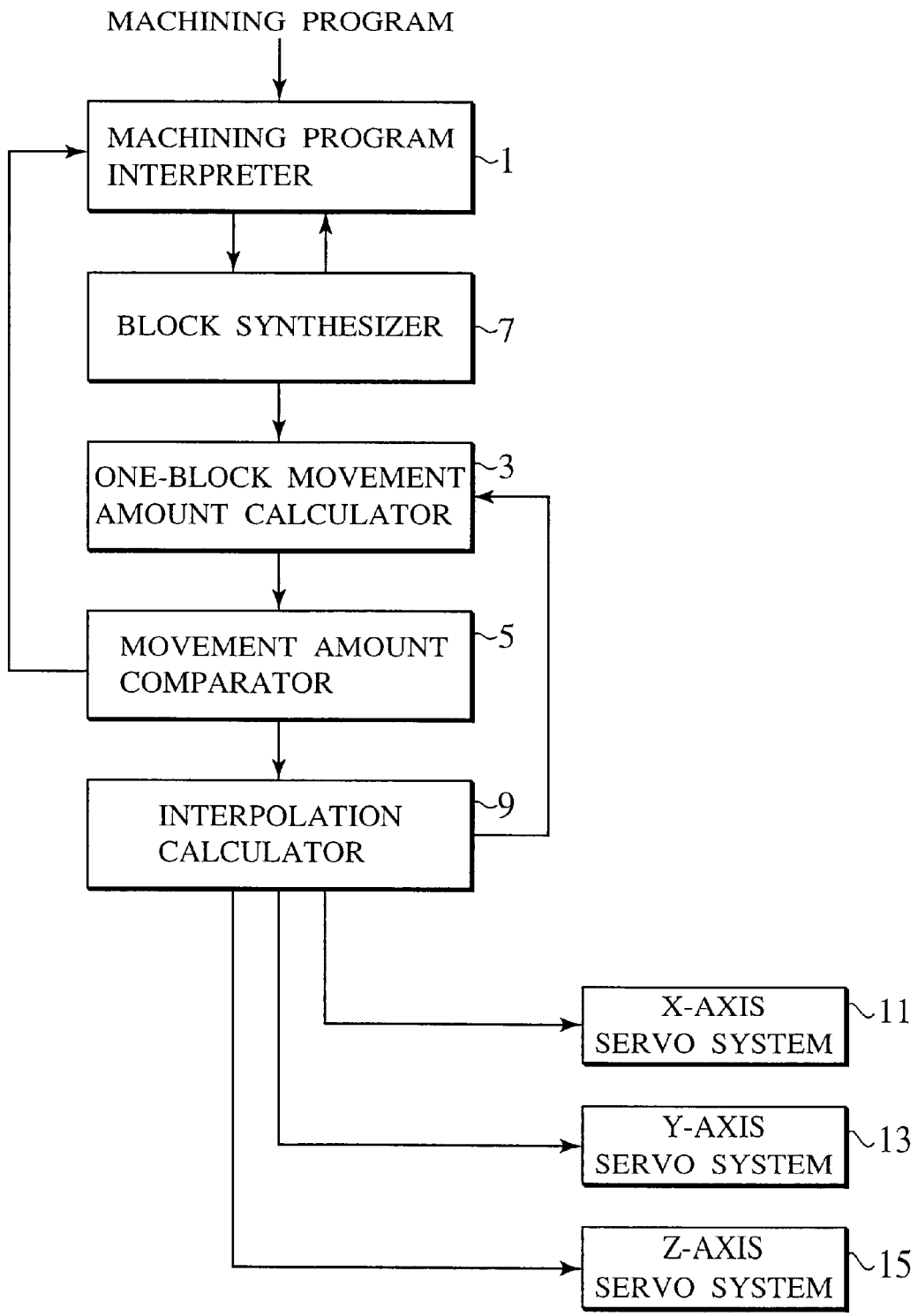
FIG. 1 is a block diagram showing functional relationships for a programmed block of commands in an embodiment of a numerical control apparatus according to the present invention.

FIG. 1 shows an embodiment of a numerical control apparatus according to the present invention, as a control box for a machining tool in which an X-Y-Z orthogonal reference coordinate system is defined. This apparatus comprises a control system having a machining program interpreter as an analyzer 1, a one-block movement amount calculator (synthesized remaining movement calculator) 3, a movement amount comparator 5, a block synthesizer 7, and an interpolation calculator 9.

The machining program interpreter 1 reads in and interprets a machining program.

The one-block movement amount calculator 3 calculates the amount of movement called for by one block of commands (including a block that has been synthesized by the block synthesizer 7) interpreted by the machining program interpreter 1.

The movement amount comparator 5 performs a comparison between the amount of movement L called for by the commands of one block as calculated by the one-block movement amount calculator 3 and the minimum amount of movement Lmin, as established by the feed speed and one sampling period of the numerical control apparatus, and passes the commands of the block to the interpolation calculator 9 only if the programmed amount of movement L is greater than the minimum movement amount Lmin.

The block synthesizer 7 reads in the result from the movement amount comparator 5 and, if the amount of programmed movement L is smaller than the minimum movement amount Lmin, reads in the immediately next block of commands and synthesizes by concatenating this next block to the current block, the synthesized block being then passed as a single block to the movement amount comparator 5.

The interpolation calculator 9 performs interpolation for each block of commands, and outputs interpolation commands to the servo system for each axis, which in the case of this embodiment is the X-axis servo system 11, the Y-axis servo system 13, and the Z-axis servo system 15. Because the amount of remaining movement from the interpolation calculation is returned to the one-block movement amount calculator 3, when a block is synthesized the one-block movement amount calculator 3 actually calculates the synthesized amount of remaining movement.

An embodiment of a feed control processing method for a numerical control apparatus according to the present invention is described below, with reference made to FIG. 2.

First, a machining program is read in and interpreted by the machining program interpreter 1 (step S10), after which the amount of movement L called for by one block $B_n$ is calculated by the one-block movement amount calculator 3 (step S11). The amount of movement is the distance from the starting point $P_s$ to the ending point $P_e$ of the block of commands $B_n$, and is calculated from the following relationship.

$$L=\sqrt{\{(Xe-Xs)^2+(Ye-Ys)^2+(Ze-Zs)^2\}}$$

In the above:

Xs and Xe are the starting and ending X-axis points of the block;

Ys and Ye are the starting and ending Y-axis points of the block; and

Zs and Ze are the starting and ending Z-axis points of the block.

Xs and Ze are the starting and ending Z-axis points of the block.

Next, a comparison is made by the movement amount comparator 5 between the movement amount L and the minimum movement amount Lmin established by the feed speed and the sampling period of the numerical control apparatus (step S12). For a minimum movement amount of Lmin, a sampling period in seconds of Ts, and a feed speed in mm/minute of F, the following relationship obtains.

$$Lmin=Ts \cdot F/60$$

If the amount of movement L is greater than the minimum movement amount Lmin (L≧Lmin) (Yes result at step S12), the interpolation calculator 9 performs calculation of interpolation for the commands of the block $B_n$ (step S13), and outputs the interpolated values for each axis to the corresponding servo systems (step S14).

Figure 2:
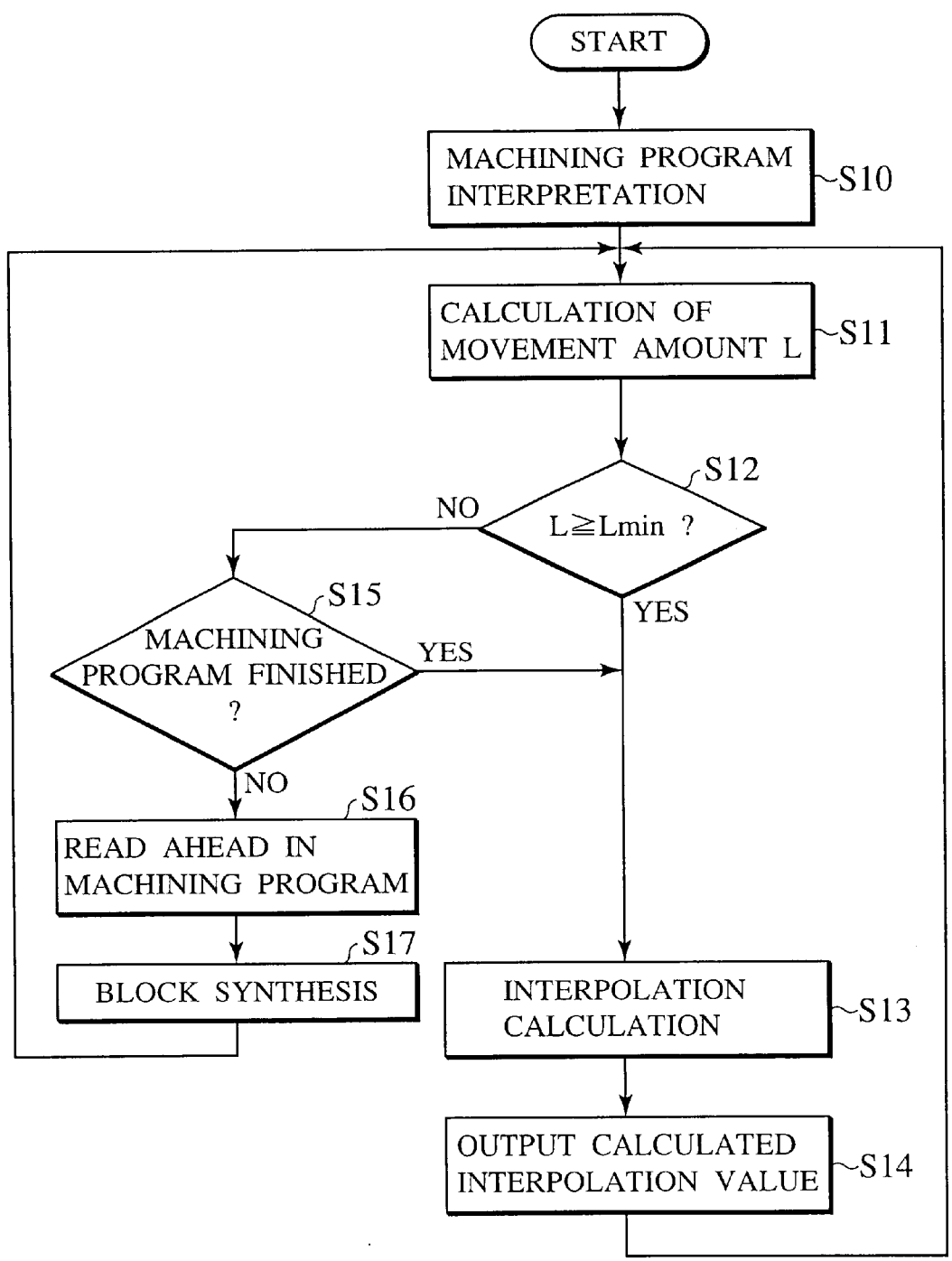
FIG. 2 is a flowchart showing an embodiment of a feed control processing method for a numerical control apparatus according to the present invention.
Figure 3:
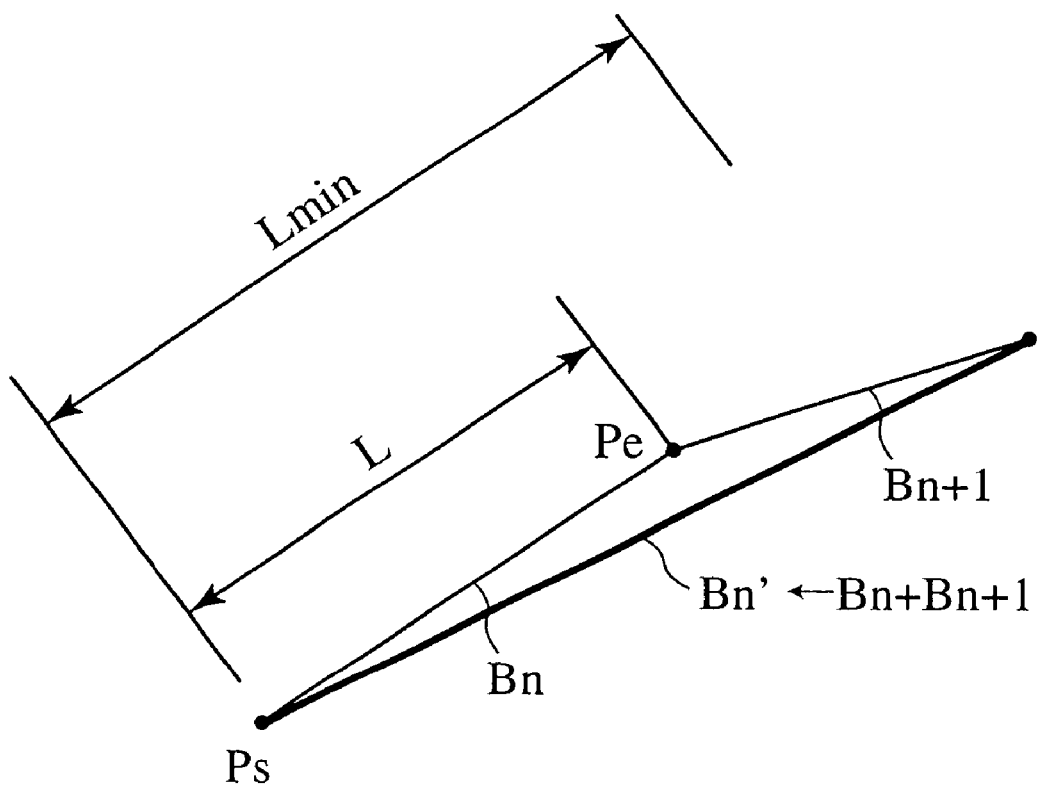
FIG. 3 is a drawing showing an example of block synthesis in a feed control processing method for a numerical control apparatus according to the present invention.

If, however, as shown in FIG. 2 or as illustrated in FIG. 3, the movement amount L is smaller than the minimum movement amount (No result at step S12), a check is made as to whether the program under execution has been completed (Step S15). If the program has been completed (Yes result at step S15), the interpolation calculator 9 performs calculation of interpolation for the commands of the current block $B_n$ (step S13) and outputs the interpolated values for each axis to the corresponding servo systems (step S14).

If, however, the end of the program has not yet been reached, (No result at step S15), the immediately next block of the machining program is read into the block synthesizer 7 (step S16), and this next block of commands is concatenated with the block $B_n$ by the block synthesizer 7 ($B_n$= $B_n+B_{n+1}$) (step S17), this synthesized block $B_n$ being passed as one block to the one-block movement amount calculator 3, which calculates the amount of movement L called for by the commands of the one block $B_n$. Thereafter, if the amount of movement L for the synthesized block $B_n$ is smaller than the minimum movement amount Lmin, the process of concatenating subsequent blocks of commands is continued until the condition L≧Lmin is satisfied.

The effect of the above operations is to execute feed control for a block only if the movement L called for by the commands of the block is greater than the minimum movement amount Lmin, but in the case in which the amount of movement called for is smaller than the minimum movement amount, to concatenate subsequent blocks of commands until a synthesized block calling for an amount of movement greater than Lmin is obtained, the synthesized block being taken as a unit for executing feed control.

As a result, even if blocks requiring an amount of movement L smaller than the minimum movement amount Lmin are included in the machining program, it is possible to achieve continuous feed and further to achieve both machining accuracy and machining capacity, without reducing the feed speed. The present invention enable direct use of a machining program generated by a CAD or CAM system or the like, thereby facilitating development and debugging of the machining program.

While preferred embodiments of the present invention have been described using specific examples, such descriptions are for illustrative purposes, and it is to be understood that changes and variations may be made without departing from the spirit or scope of the following claims.

What is claimed is:

1. A feed control processing method for a numerical control apparatus, comprising:

reading a machining program and determining if an amount of movement called for by a current block of commands is greater than or less than a minimum amount of movement established by a feed speed and a one sampling period of the numerical control apparatus;

performing feed control according to the current block of commands if the amount of movement called for is greater than the minimum amount of movement;

concatenating the current block with an immediately subsequent block to form a synthesized block of commands if the amount of movement called for by the current block is smaller than the minimum amount of movement; and repeating the concatenating of blocks until a synthesized block is obtained calling for an amount of movement larger than the minimum amount of movement and performing feed control with the thereby obtained block of commands.

2. A numerical control apparatus that determines if an amount of movement called for by a current block of commands in a machining program is greater than or less than a minimum amount of movement established by a feed speed and a one sampling period thereof, and performs feed control according to the current block of commands if the amount of movement called for is greater than the minimum amount of movement, but concatenates the current block with an immediately subsequent block to form a synthesized block of commands if the amount of movement called for by the current block is smaller than the minimum movement amount, repeating the concatenation of blocks until a synthesized block calling for an amount of movement greater than the minimum movement amount is obtained, and performs feed control according to the thereby obtained synthesized block.

3. A numerical control apparatus comprising:

a machining program interpreter for reading in and interpreting a machining program;

a one-block movement calculator for calculating an amount of movement called for by one block of commands interpreted by the machining program interpreter;

an interpolation calculator for performing interpolation for each block;

a movement comparator for comparing the amount of movement required by one block as calculated by the one-block movement calculator and the a minimum amount of movement as established by a feed speed and a one sampling period of the numerical control apparatus, and passing the commands of a block to the interpolation calculator only if the amount of movement for that block is larger than the minimum movement amount; and a block synthesizer, which if the amount of movement called for by the current block is determined by the comparison to be smaller than the minimum movement amount, reads ahead to the immediately following block and concatenates that block with the current block.

* * * * *